United States Patent [19]

Ohsawa et al.

[11] 4,445,755
[45] May 1, 1984

[54] INFRARED TRANSMITTING OPTICAL WAVE GUIDE

[75] Inventors: Kazuya Ohsawa; Toshiaki Shibata, both of Yokohama; Kenichi Takahashi, Tokyo, all of Japan

[73] Assignee: Director-General of Agency of Industrial Science and Technology, Tokyo, Japan

[21] Appl. No.: 358,687

[22] Filed: Mar. 16, 1982

[30] Foreign Application Priority Data

Apr. 3, 1981 [JP] Japan .................................. 56-49433

[51] Int. Cl.³ ............................................ G02B 5/172
[52] U.S. Cl. ..................................... 350/96.34; 501/37
[58] Field of Search .......................... 350/96.30, 96.34; 501/37, 38, 53

[56] References Cited

U.S. PATENT DOCUMENTS 4,328,318   5/1982   Miranday et al. ................ 350/96.34
4,343,638   8/1982   Mitachi et al. ................... 350/96.34

OTHER PUBLICATIONS

Journal of Non-Crystalline Solids 27, (1978), 273–283.
Mat. Res. Bull., vol. 15, pp. 213–219, 1980.
Electronics Letters, 2/5/81, vol. 17, pp. 128–129.

*Primary Examiner*—John D. Lee
*Assistant Examiner*—Brian Healy
*Attorney, Agent, or Firm*—Frishauf, Holtz, Goodman & Woodward

[57] ABSTRACT

Fluorozirconate glasses containing sodium fluoride and aluminum fluoride are used to improve an infrared transmitting fluoride glass optical wave guides thereby to obtain optical wave guides having high numerical aperture.

2 Claims, No Drawings

INFRARED TRANSMITTING OPTICAL WAVE GUIDE

BACKGROUND OF THE INVENTION

This invention relates to an infrared transmitting optical wave guide, and more particularly to an infrared transmitting optical wave guide useful for the transmission of infrared having a wavelength of 2 to 6 microns.

Measurement of low temperature close to room temperature generally demands the use of a material which allows permeation of an infrared having as long a wavelength as possible. Where temperature measurement is made in an extremely narrow area or where a temperature gauge can not be brought near the object for measurement, then it is necessary to provide a means to measure temperature by transmitting infrared to a place remote from the object.

In recent years, zirconium fluoride glass is regarded as useful as a material of optical wave guides which allows the passage of infrared having such a long wavelength as 2 to 6 microns. An optical wave guide is recently proposed which is formed of the above-mentioned type of glass. However, the zirconium fluoride glass is thermally unstable and presents a problem of being crystallized by heat. Moreover, the zirconium fluoride glass has a narrow glass-forming region, making it impossible to produce glass materials having widely varied compositions. Consequently, it is difficult to obtain glass materials having different refractive indices. To date, therefore, there has been no infrared transmitting optical wave guide whose core and cladding are both made of zirconium fluoride glass. As a solution to the above-mentioned problem, it is proposed to dope the core glass component with a composition capable of increasing the refractive index of the glass, for example, lead fluoride, or bismuth fluoride. However, addition of such composition harms the stability of the zirconium fluoride glass. Therefore, no success has been achieved yet by such method.

SUMMARY OF THE INVENTION

The object of this invention is to provide an infrared transmitting optical wave guide made of a novel glass material adapted to be used as both core and cladding of an infrared transmitting optical wave guide in order to resolve difficulties encountered in the past. To attain the above-mentioned object, this invention provides an infrared transmitting optical wave guide characterized in that the core glass and cladding glass each contain 52 to 69 mol% of zirconium fluoride, 10 to 24 mol% of barium fluoride, 1 to 7 mol% of lanthanum fluoride, 9 to 25 mol% of sodium fluoride and 2 to 5 mol% of aluminum fluoride, the total content of zirconium fluoride, barium fluoride, sodium fluoride and lanthanum fluoride being 90 mol% or over in the core glass and in the cladding glass, and the cladding glass having a higher content of sodium fluoride than the core glass.

DETAILED DESCRIPTION OF THE PREFERRED EMBODIMENT

A glass in four-component glass system consisting of zirconium fluoride, barium fluoride, sodium fluoride and lanthanum fluoride remains considerably stable, if the content of zirconium fluoride is in the range of 52 to 69 mol%, the content of barium fluoride is in the range of 10 to 24 mol%, the content of sodium fluoride is in the range of 9 to 25 mol% and the content of lanthanum fluoride is in the range of 1 to 7 mol%. Hitherto, it has been necessary to apply considerably quick quenching in order to obtain a block of zirconium fluoride glass material. In contrast, the glass material of this invention constituting an infrared transmitting optical wave guide can be cast into a block without quenching. The glass material of this invention used in the infrared transmitting optical wave guide can provide a stable relevant glass product under slow cooling over a broader glass-forming region than has been possible with the conventional glass material. Therefore, it has become possible to provide from within such a broader range a combination of glass components having a refractive index large enough to use with an infrared transmitting optical wave guide. The refractive index of the glass component of the invention whose composition falls within the aforementioned range can be changed to an extent ranging from about 1.47 to about 1.51 by varying the content of sodium fluoride. Where a core glass component has a refractive index of 1.50 and a cladding glass component has a refractive index of 1.48, then it is possible to provide an infrared transmitting optical wave guide having a numerical aperture of 0.24.

Where it is possible to use the core and cladding glass components of the same chemical system, the advantage is offered to stabilize the structure of the subject infrared transmitting optical wave guide due to the chemical potential of both glass components being alike. However, the glass material of the four-component system varies, according to the composition, in respect of thermal stability relative to crystallization. Therefore, during the drawing process in which both core and cladding glass components are heated in one, it has been disclosed that one of the two glass components is undesirably crystallized, thus making it necessary to let the properties of the core glass component accord with those of the cladding glass component from the standpoint of assuring the high thermal stability of the subject infrared transmitting optical wave guide. It has been disclosed from various studies that the aforementioned problem can be resolved by adding aluminum fluoride to the four-component glass composition. It is preferred to add 2 to 5 mol% of aluminum fluoride. Addition of less than 2 mol% of aluminum fluoride is little effective. Conversely, addition of more than 5 mol% of the aluminum fluoride tends to give rise to an ununiform glass structure.

Table 1 below indicates how the thermal stability of the four-component glass is increased by addition of aluminum fluoride.

TABLE 1

| Basic composition (mol %) | | | | Difference between transition temperature of glass and crystallization temperature (°C.) | |
|---|---|---|---|---|---|
| ZrF$_4$ | BaF$_2$ | NaF | LaF$_3$ | Glass of basic composition | Glass containing 4 mol % of AlF$_3$ |
| 58 | 15 | 21 | 6 | 65 | 93 |
| 56 | 23 | 15 | 6 | 61 | 93 |
| 60 | 19 | 15 | 6 | 82 | 95 |

A difference between the transition temperature of glass and the crystallization temperature of glass is used as a guide in defining a temperature range within which a glass article should be worked. It may be said that as said temperature difference grows larger, a glass material can be worked with greater stability and ease. Glass materials having substantially the same range of preferred working temperature can be thermally worked at the same time. As seen from Table 1 above, addition of aluminum fluoride to glass materials having the above-listed basic compositions prominently increases said temperature differences which tend to indicate substantially the same level. Therefore a glass material prepared by adding aluminum fluoride to the above-mentioned basic composition of $ZrF_4$-$BaF_2$-$NaF$-$LaF_3$ can be regarded as adapted for the manufacture of a fibrous infrared transmitting optical wave guide by thermal drawing process.

Therefore, it is necessary to use glasses comprising 52 to 69 mol% of zirconium fluoride, 10 to 24 mol% of barium fluoride, 1 to 7 mol% of lanthanum fluoride, 9 to 25 mol% of sodium fluoride and 2 to 5 mol% of aluminum fluoride.

Out of the above mentioned range, glasses become not transparent, and it is difficult to obtain good glasses.

With the preferred form of a glass material constituting an infrared transmitting optical wave guide, the total content of zirconium fluoride, barium fluoride, sodium fluoride and lanthanum fluoride should not be less than 90 mol%, regardless of whether said glass material contains an impurity. Where said total content falls below 90 mol%, then the subject glass material tends to be unstable.

In order to make the refractive index of core glass higher than that of cladding, the cladding glass should contain a larger amount of sodium fluoride, preferably at least 3 mol% more than the core glass.

Preferably the core glass comprises 54 to 68 mol% of zirconium fluoride, 14 to 23 mol% of barium fluoride, 3 to 6 mol% of lanthanum fluoride, 3 to 4.5 mol% of aluminum fluoride, and the cladding glass comprise 54 to 68 mol% of zirconium fluoride, 11 to 20 mol% of barium fluoride, 3 to 6 mol% of lanthanum fluoride, 15 to 24 mol% of sodium fluoride and 3 to 4.5 mol% of aluminum fluoride.

This invention will become more apparent by reference to Example 1, which follows:

EXAMPLE 1

Core and cladding glass (Table 2 below) were prepared from zirconium fluoride, barium fluoride, sodium fluoride, lanthanum fluoride, aluminum fluoride and acidic ammonium fluoride. These core and cladding glass have refractive indices indicated in Table 2 below. A glass fiber prepared from such glass material has a numerical aperture of 0.245, a sufficient value for an optical fiber.

TABLE 2

| | Composition (mol %) | | | | | Refractive index |
|---|---|---|---|---|---|---|
| | $ZrF_4$ | $BaF_2$ | NaF | $LaF_3$ | $AlF_3$ | (hd) |
| Core glass | 58.3 | 18.4 | 14.6 | 5.8 | 2.9 | 1.5049 |
| Cladding glass | 55.3 | 11.7 | 24.3 | 5.8 | 2.9 | 1.4848 |

A core glass rod having the above-mentioned composition was produced with a diameter of 6 mm, and a cladding glass tube having the above-mentioned composition was produced with an inner diameter of about 6 mm and an outer diameter of 10 mm. The glass core rod and surrounding glass cladding were heated by a ring heater to carry out drawing, thereby continuously producing an infrared transmitting optical fiber having an outer diameter of about 200 microns and a core diameter of about 120 microns. No crystal was observed in this infrared transmitting optical wave guide, which could transmit infrared having a wavelength ranging from 2 to 6 microns with a low loss.

CONTROL 1

A glass material consisting of 62 mol% of zirconium fluoride, 30 mol% of barium fluoride and 8 mol% of lanthanum fluoride crystallized in the drawing step and could not be drawn.

CONTROL 2

An optical fiber consisting of a core made from 60 mol% of zirconium fluoride, 19 mol% of barium fluoride, 15 mol% of sodium fluoride and 6 mol% of lanthanum fluoride without adding aluminum fluoride and a cladding made from 57 mol% of zirconium fluoride, 12 mol% of barium fluoride, 25 mol% of sodium fluoride and 6 mol% of lanthanum fluoride, without addition of aluminum fluoride, tended to crystallize on the surface, breaking occasionally, at the time of drawing and was difficult to continuously draw.

What we claim is:

1. An infrared transmitting optical wave guide formed of a core glass and a cladding glass having a smaller refractive index than said core glass, wherein both core and cladding glass comprise 52 to 69 mol% of zirconium fluoride, 10 to 24 mol% of barium fluoride, 1 to 7 mol% of lanthanum fluoride, 9 to 25 mol% of sodium fluoride and 2 to 5 mol% of aluminum fluoride; the total content of said zirconium fluoride, barium fluoride, lanthanum fluoride and sodium fluoride is chosen to be over 90 mol%; and the cladding glass contains a larger amount of sodium fluoride than the core glass.

2. The infrared transmitting optical wave guide according to claim 1, wherein the core glass comprises:
54 to 68 mol% of zirconium fluoride;
14 to 23 mol% of barium fluoride;
3 to mol% of lanthanum fluoride;
10 to 20 ml% of sodium fluoride; and
3 to 4.5 mol% of aluminum fluoride,
the cladding glass comprises:
54 to 68 mol% of zirconium fluoride;
11 to 20 mol% of barium fluoride;
3 to 6 mol% of lanthanum fluoride;
15 to 24 mol% of sodium fluoride; and
3 to 4.5 mol% of aluminum fluoride.

* * * * *